United States Patent [19]

Goodfellow et al.

[11] Patent Number: 5,572,102

[45] Date of Patent: Nov. 5, 1996

[54] METHOD AND APPARATUS FOR VISION CONTROL OF WELDING ROBOTS

[75] Inventors: John Goodfellow, Waterloo; Wilhelm Doerr, Kitchener, both of Canada

[73] Assignee: Budd Canada Inc., Kitchener, Canada

[21] Appl. No.: 395,810

[22] Filed: Feb. 28, 1995

[51] Int. Cl.$^6$ ............................. B25J 09/22; B23K 09/12
[52] U.S. Cl. ............... 318/568.13; 318/570; 364/474.12; 364/474.34; 219/130.01; 219/124.1
[58] Field of Search .............................. 364/DIG. 1, 513, 364/478, 101, 190, 474.12, 474.28, 474.33, 474.34; 356/375, 394, 376; 901/42, 2, 30, 47; 318/568.12, 568.13, 568.16, 569, 570, 577; 219/130.01, 124.1, 124.22, 124.4, 125.1

[56] References Cited

U.S. PATENT DOCUMENTS

| | | |
|---|---|---|
| 4,491,719 | 1/1985 | Corby, Jr. . |
| 4,555,613 | 11/1985 | Shulman ................................. 901/42 |
| 4,559,555 | 12/1985 | Schoolman . |
| 4,575,637 | 3/1986 | Sullivan, Jr. ............................. 356/394 |
| 4,593,173 | 6/1986 | Bromley et al. . |
| 4,613,269 | 9/1986 | Wilder et al. ............................ 364/513 |
| 4,634,879 | 1/1987 | Penney ..................................... 250/560 |
| 4,707,647 | 11/1987 | Coldren et al. . |
| 4,812,614 | 3/1989 | Wang et al. . |
| 4,822,163 | 4/1989 | Schmidt . |
| 4,831,233 | 5/1989 | Gordon ..................................... 901/47 |
| 4,849,679 | 7/1989 | Taft et al. . |
| 4,850,712 | 7/1989 | Abshire . |
| 4,891,767 | 1/1990 | Rzasa et al. .............................. 901/2 |
| 4,907,169 | 3/1990 | Lovoi . |

FOREIGN PATENT DOCUMENTS 0377755  6/1989  European Pat. Off. .

Primary Examiner—John W. Cabeca
Attorney, Agent, or Firm—Harness, Dickey & Pierce, P.L.C.

[57] ABSTRACT

A vision system for controlling welding robots and a method of controlling a welding robot using a vision system are disclosed. The vision system includes an ordinary unoriented light source, such as a fluorescent light source, to illuminate a part to be welded so that a light intensity gradient is created along a seam to be welded. An image of the light intensity gradient is captured by one or more fixed solid-state video cameras. The image is compared with a stored image of a reference part so that a deviation of the seam to be welded with respect to the seam of the reference part can be computed for each of a plurality of predefined reference points. The deviation at each reference point is translated by a microprocessor into a coordinate adjustment which is downloaded to a controller for the robot. The controller converts the learned coordinates of the reference part into the actual coordinates of the seam to be welded using the coordinate adjustments provided by the microprocessor, permitting the robot to weld the seam without vision sensing or weld path adjustments during the welding process. The advantage is a cost effective vision system which can be shared among robots, simpler equipment, simpler control software, and increased efficiency because real time weld path correction maneuvers are eliminated.

20 Claims, 4 Drawing Sheets

5,572,102

METHOD AND APPARATUS FOR VISION CONTROL OF WELDING ROBOTS

FIELD OF THE INVENTION

The present invention relates to vision systems for controlling welding robots and, in particular, to an apparatus and a method of using an unoriented light source that is independent of the robot to illuminate a seam to be welded so that a light intensity gradient is created along the seam, the gradient being detectable by a vision system which calculates adjustments to reference welding coordinates that permit the robot to weld the seam using adjusted coordinates that represent an actual location of the seam.

Robots are commonly used for automated welding applications. Robots are adapted to learning spatial positions by example and repeatedly relocating the same points in space. This permits a robot to repeat a given weld path an indefinite number of times. In real welding applications, however, a seam to be welded is often not identical to the seam of a reference part from which the robot was taught a weld path. Consequently, it is often necessary to deviate from the learned weld path in order to produce a strong and effective weld. Robots are incapable of deviation from a learned weld path without external assistance. As a result, a need for a vision system for tracking weld seams was recognized and many such vision systems have been invented.

Prior art vision systems typically use an oriented light source, such as a laser light source, to detect a weld seam. They also typically compute corrections to a learned weld path in an interactive process as the seam is welded. Such systems have certain drawbacks. Oriented light sources such as lasers are relatively expensive and can constitute a hazard to operators. In addition, most prior art systems require a camera and a light source mounted on the robot in close proximity to the welding operation. This increases maintenance because both the camera and the light source are exposed to smoke, slag, and metallic back splash that can damage those components. They also require relatively sophisticated data processing equipment for executing complicated algorithms to detect a weld seam in close proximity to the intense light of a welding torch and to compute corrections to the weld path in real time while welding is in progress. A further drawback is that a light source and a camera are installed on each robot, which contributes to the cost of automated welding equipment.

U.S. Pat. No. 4,812,641 entitled MACHINE VISION SEAM TRACKING METHOD AND APPARATUS FOR WELDING ROBOTS issued on Mar. 14, 1989 to Wang et al. This patent describes a vision welding system which uses an ordinary light source that is focused through a fiber optic bundle on a seam to be welded. The fiber optic bundle is oriented at an angle on one side of the weld seam. A detector is oriented at an equal and opposite angle on the other side of the weld seam. The triangulation of the focused light and the detector are used to locate and track the location of the seam so that welding can be accomplished. Although this invention overcomes the requirement for an oriented light source, it suffers from the other drawbacks described above. It also suffers from the disadvantage of requiring a light source and a detector that must be oriented at equal and opposite angles on opposite sides of the robot welder. This restricts the robot's work envelope and increases the danger of collision with objects entering the robot's operating field.

European patent application 0 377 755 entitled VISUAL CONTROL ROBOT SYSTEM was published on Jul. 18, 1990. This application relates to a visual control system developed by Fanuc Limited. The system includes a laser light source and a solid state digital camera that are mounted on a knuckle of a robot just above a welding torch. The laser light source and the camera are always fixed in a predetermined relationship with one another. The laser light source is designed to operate as an arc vision sensor which is controlled by an arc vision sensor controller connected to a CRT display. Prior to a welding operation, an operator mechanically teaches the robot a series of spaced-apart weld coordinates along a reference weld seam. Concurrently or in immediate succession, the operator teaches the visual coordinates of the reference weld seam. An image of the weld seam at each coordinate is stored for later reference. During the welding process, each time the welding torch reaches a reference coordinate, the vision system captures an image of the weld seam and compares the image with the stored image for the reference coordinate. The vision controller calculates the magnitude of the deviation between the two camera images and calculates a correction for the deviation between the reference weld seam and the actual weld seam based on the calculated deviation and a scaling factor which compensates for image distortion relating to the distance between the laser beam projector and the camera and between the laser beam projector and the weld. The vision sensor controller then sends the correction data to the robot controller and the robot controller effects a real time correction of the weld path. This system likewise suffers from certain drawbacks, namely; an expensive laser light source is required; correction of the weld line is done piece meal which increases the amount of computation required and, potentially, frequent adjustment maneuvers by the robot; and, sophisticated algorithms for comparing images and computing corrections and scale factors are required.

In view of the prior art, it is considered desirable to provide a simple and inexpensive vision control apparatus for robots that permits the sequential automatic welding of a plurality of similar parts. It is also considered desirable to provide a method of vision control for welding robots which permits the use of an ordinary, unoriented light source for detecting the location of a seam to be welded.

SUMMARY OF THE INVENTION

It is an object of the invention to provide a vision control system for a robot welder that uses an unoriented light source that is independent of the robot to locate the position of a seam to be welded.

It is a further object of the invention to provide a method of vision control for a robot welder that permits the robot to weld a seam using real coordinates of the seam so that in-process correction maneuvers are eliminated.

In accordance with a first aspect of the invention there is provided an apparatus for controlling the operation of a robot welder to effect the sequential welding of a plurality of parts having seams to be welded, each of the parts being similar to a known reference part, comprising:

an unoriented light source that is independent of the robot and positioned to illuminate the seam to be welded so that a light intensity gradient is detectable along the seam;

vision sensor means for acquiring a digital image of the seam to be welded, the vision sensor means being independent of the robot and positioned to acquire images that capture the light intensity gradient along the seam;

image processor means for accepting the images from the vision sensor means and for processing the images to determine from a digitized representation of the light intensity gradient a deviation of the seam with respect to a reference weld path at each of a plurality of reference points spaced along the reference weld path;

data processor means for accepting each deviation from the image processor means and for convening each deviation to a coordinate adjustment for a respective one of each of the plurality of reference points, each coordinate adjustment being expressed in a format readable by a controller of the robot; and means for communicating the coordinate adjustments to the controller of the robot, whereby the robot is enabled to weld along the seam using predetermined adjusted coordinates for the seam to be welded.

In accordance with a second aspect of the invention there is provided a method for controlling the operation of a robot welder to effect the automatic welding of a seam on a part to be welded that is similar to a reference part having a weld path that has been taught to the robot, comprising:

a) illuminating the part to be welded with an unoriented light source that is independent of the robot to create a light intensity gradient that is detectable along the seam to be welded;

b) operating an electronic vision system that is independent of the robot to acquire at least one digital image of the seam to be welded;

c) operating a vision system controller to analyze the at least one digital image to isolate an image of the seam to be welded; to compare the image of the seam to be welded with a stored image of the weld path on the reference part; and, to compute a deviation in at least one plane of the image of the seam to be welded from the weld path on the reference part;

d) operating the vision system controller to communicate the deviations to a data processor;

e) operating the data processor to translate the deviations to respective coordinate adjustments expressed in a format readable by a controller of the robot welder and to communicate the respective coordinate adjustments to the controller of the robot welder;

f) operating the controller of the robot welder to adjust the learned coordinates of the weld path of the reference part using the coordinate adjustments to provide an adjusted set of coordinate points that correspond to a weld path for the seam to be welded; and g) operating the robot to effect the welding of the seam using the set of adjusted coordinate points so that the seam can be accurately welded without visual detection or weld path corrections during the welding process.

The invention therefore provides a simple apparatus which is cost effectively assembled for guiding one or more robots along weld a seam. Any seam configuration is weldable provided that the unoriented light source is positioned to provide a light intensive gradient that is detectable along the seam. For butt joints and the like, it is advantageous to place the light source behind the workpiece so that light shines through the seam to provide the intensity gradient.

As noted above, the apparatus for controlling the operation of a robot welder can be used to control several welders simultaneously. This permits the division of welding of long scants among two or more welding robots which work simultaneously to effect the welding of the seam. Because both the unoriented light source and the vision sensors are independent of the robot(s) and preferably spaced some distance from the weld path, maintenance is minimized and efficiency is maximized. The unoriented light source, preferably a fluorescent light source, may be equipped with a mechanized cover to prevent exposure to welding slag and metal back splash during welding operations. A simple cover that is automatically opened during the weld seam detection process and closed during welding operations is preferable.

The invention also provides a method for controlling the operation of a robot welder which represents a unique approach to the problem. Instead of an interactive online process using light sources and sensors dedicated to each robot, an offline process using an inexpensive unoriented light source and shared sensors is used. This novel process offers several advantages over the known prior art, including: reduction in startup cost and hardware maintenance; reduced expense for the vision sensor system; reduced demand for sophisticated data processors and complicated software; increased efficiency because robots weld an entire weld path that is computed in a single prewelding operation, eliminating corrective movements and minimizing change of direction stress.

BRIEF DESCRIPTION OF THE DRAWINGS

The preferred embodiments of the invention will now be explained by way of example only and with reference to the following drawings wherein.

DETAILED DESCRIPTION OF THE PREFERRED EMBODIMENT

Figure 1:
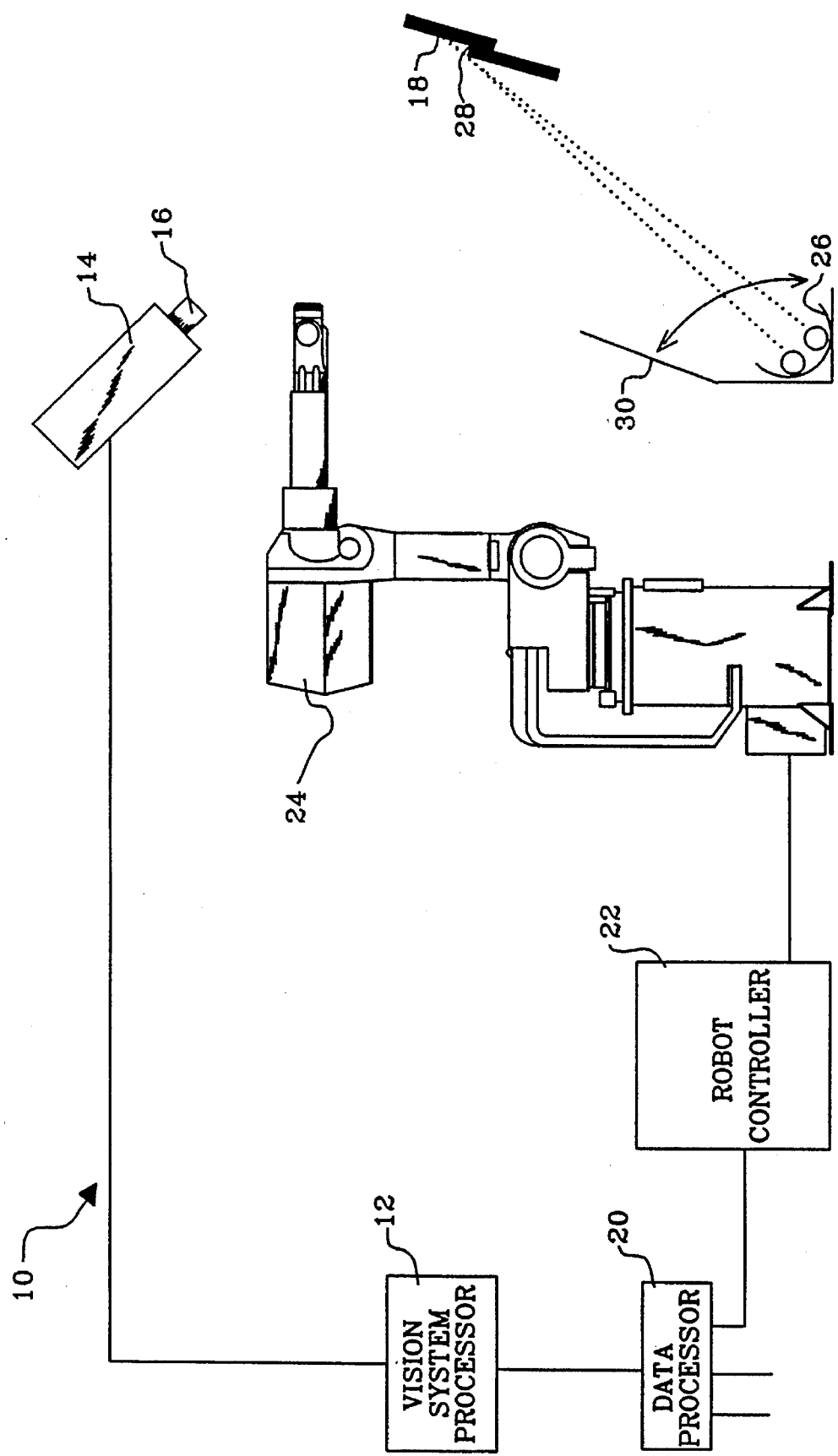
FIG. 1 is a schematic diagram of a vision tracking system in accordance with the invention.

FIG. 1 is a schematic diagram of an apparatus for controlling the operation of a robot welder, generally referred to by reference 10. The apparatus is readily constructed from known commercially available components. The components include a vision system processor 12, which is connected to one or more solid state cameras 14. The solid state cameras 14 are preferably equipped with fixed focal length lenses 16. The focal length of the lens is selected to provide the best focus of a part 18 to be welded while permitting the camera 14 to be located outside the work envelope of a robot 24. Connected to an output port of the vision system is a data processor 20. The data processor 20 is preferably a commonly available microcomputer. An output port of the data processor 20 is connected to a robot controller 22 that controls the robot 24. The data processor 20 may be connected to several robot controllers 22 that are served by a single vision system. Each robot 24 is equipped with welding equipment (not illustrated), commonly MIG welding equipment.

An ordinary unoriented light source 26 is positioned to provide a light intensity gradient that is detectable along a seam 28 to be welded. The light source 26 is preferably one or more commonly available fluorescent light fixtures equipped with commercially available fluorescent tubes such as "daylight" tubes, available from any supplier. Incandescent bulbs can also be used but experience has shown that incandescent bulbs are more prone to produce bright spots and glare. Each light fixture may optionally include a displaceable cover 38 which is used to protect the light from welding slag and metallic back splash during welding operations. The cover 38 is opened and closed by a simple mechanical linkage that is controlled by the data processor 20 or the robot controller 22. The cover 30 is moved to an opened position while the seam 28 is being scanned by the camera 14. Cover 30 is closed during welding operations in order to minimize maintenance of the light source 26.

The apparatus in accordance with the invention is designed for the sequential welding of a plurality of parts having seams to be welded. It is not intended for unique one-of welding operations. It is useful in production environments where a given weld path must be repeatedly executed. It is particularly useful in production environments where a seam 28 to be welded may deviate within limits from a known weld path on a reference part.

As an example, frame members for automobiles and trucks are commonly constructed from two die-shaped steel components that are welded together to form a box beam. While care is taken in the stamping process to produce components that are as consistent in shape as possible, minor variations in the shape of the edges of each component are inevitable due to uncontrollable twisting of sheet steel in the dies when the components are stamped. An edge treatment to provide components with entirely consistently shaped edges is not only prohibitively expensive, it is also wasteful of material. It is therefore necessary to be able to weld an actual seam 28 on each component regardless of its lack of conformance to the weld path of the reference part.

Figure 2:
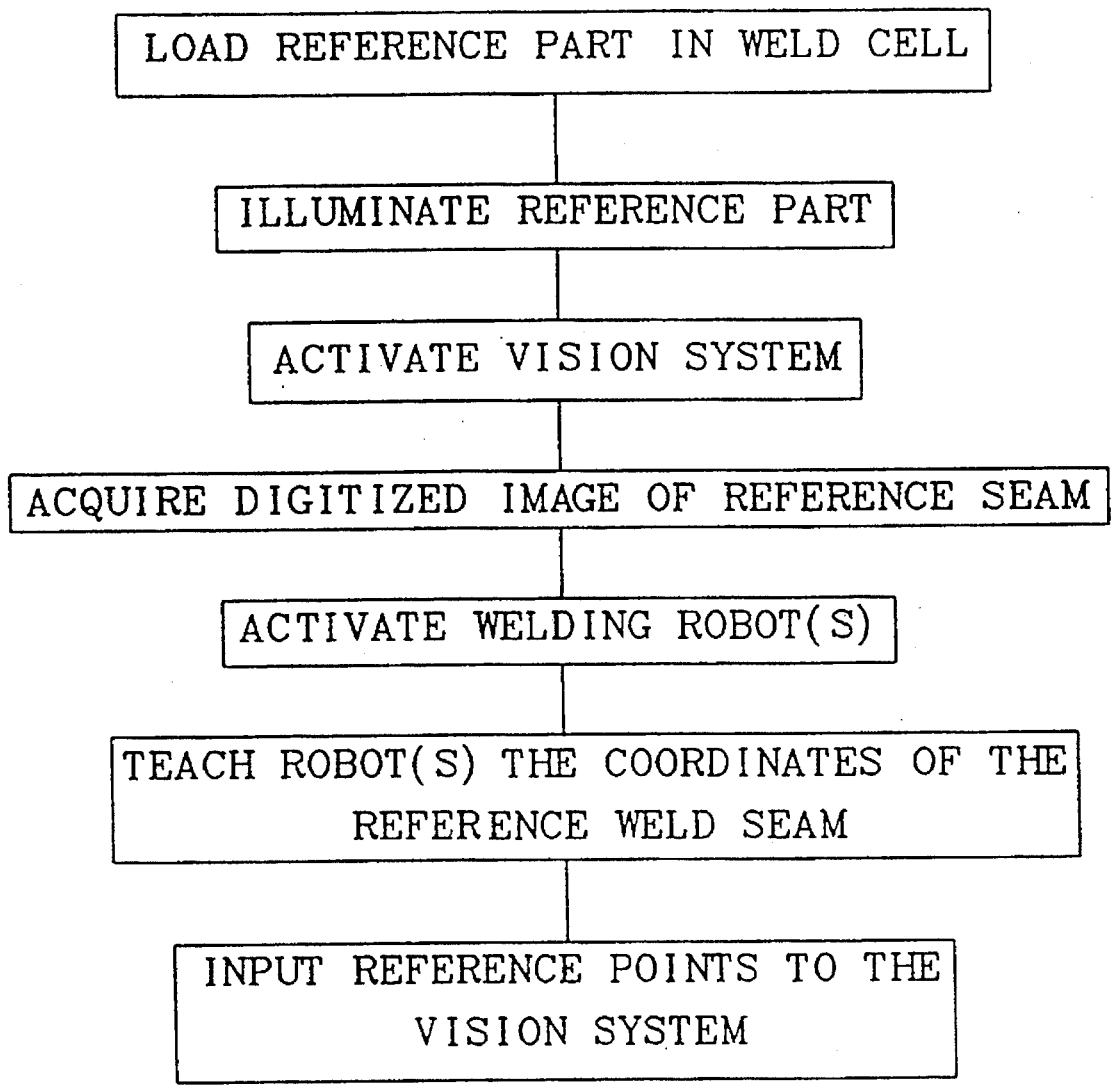
FIG. 2 is flow diagram of the training sequence for the apparatus schematically illustrated in FIG. 1.

FIG. 2 illustrates a flow diagram of a training sequence for the apparatus 10 in accordance with the invention. Training commences by loading a reference part in a weld cell. A part 18 to be welded is preferably suspended from opposite ends by robot clamps (not illustrated) at a convenient working height. A part 18 to be welded may likewise be supported on a rack, table or other convenient clamping arrangement which does not obstruct light from the light source 26 or the camera's 14 view of the seam 28 (see FIG. 1). After the reference part is secured in the welding position, the reference part is illuminated using the unoriented light source 26 and the vision system is activated to capture an image of the weld seam on the reference part. One or more cameras 14 are used to acquire images of the reference part. The number of cameras 14 required depends on the length of the seam to be welded and the focal field of the particular camera used. Cameras 14 are preferably fixed cameras securely mounted to an overhead rack outside the work envelope of the robot 24 (see FIG. 1).

The acquired digitized image of the reference seam is stored by the vision system processor 12 for later reference. The robot 24 is then activated and taught the coordinates of the reference weld path by point-to-point techniques well known in the art. Each point on the reference weld path is generally empirically established by a skilled person versed in robot welding. After the robot has been taught the coordinates of each point on the reference weld path, the digitized image acquired by the vision system is displayed on a CRT and each reference point is indicated on the image of the reference weld path using a graphics mouse, or the like, in a manner well known in the art. The sequence of acquiring the reference image and teaching the robot the coordinate points of the weld line can, of course, be reversed without consequence.

Figure 3:
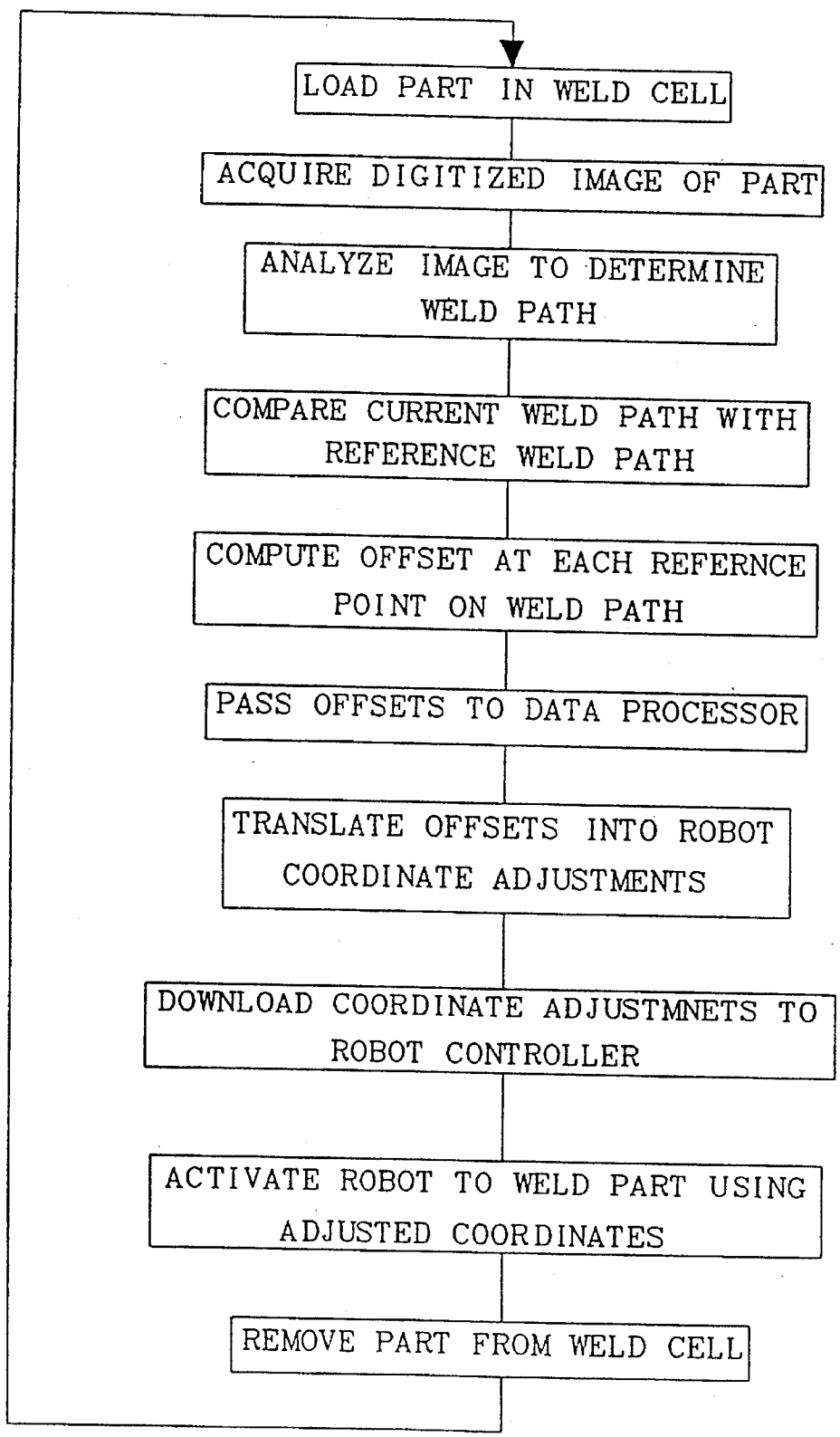
FIG. 3 is a flow diagram of a welding sequence using the apparatus schematically illustrated in FIG. 1.

After the training sequence is completed, the weld cell may be used for production welding operations. FIG. 3 shows a flow diagram of the welding operation in accordance with the invention. To initiate a welding operation, the robot(s) 24 (see FIG. 1) are moved to an initial position to permit the part 18 to be positioned in the cell and to permit a clear view of the part 18 so that the camera(s) 14 can acquire a digitized image of the seam 28. If the unoriented light source 26 is provided with a cover 38, the cover 38 is moved to an open position so that the unoriented light illuminates the part 18 to be welded.

The digitized image captured by camera 14 is communicated to the vision system controller 12 which analyses the image to isolate the weld path on part 18. When the weld path has been determined, it is compared with the stored image of the reference weld path and an offset or deviation is computed for each learned coordinate point on the reference weld path. The computed offsets or deviations are communicated in a string to the data processor 20. The data processor accepts the string of offsets and translates each data item in the string to a coordinate adjustment expressed in a format which is readable by the robot controller 22. In order to ensure efficiency and continuous production, the data processor 20 runs a program to compensate for offsets that are out of range, as will be described in detail with reference to FIG. 4.

The translated offsets are downloaded to the robot controller 22. A typical welding robot locates a position using six axis coordinates. Those coordinates can be located on an x-y-z grid. For most welding operations, it is sufficient to measure offsets along one axis only since the weld path generally deviates from the reference in a single plane. Coordinate adjustments for one plane only are normally passed to the robot controller 22. The adjustments are passed in a three coordinate format that is interpreted by the robot controller 22 into adjustments to the six axis coordinates acquired when the robot was taught the reference weld path. After the robot controller 22 has completed interpretation of the adjustments to the learned coordinates, the robot is activated and the seam is welded from beginning to end without further position calculation, weld path adjustment, or corrective maneuvers. This permits the use of several robots to weld a single seam, each of the robots commencing their particular portion of the seam simultaneously and welding as fast as the welding equipment can be operated. After welding is complete, the welded part is removed from the weld cell and the process is repeated.

Figure 4:
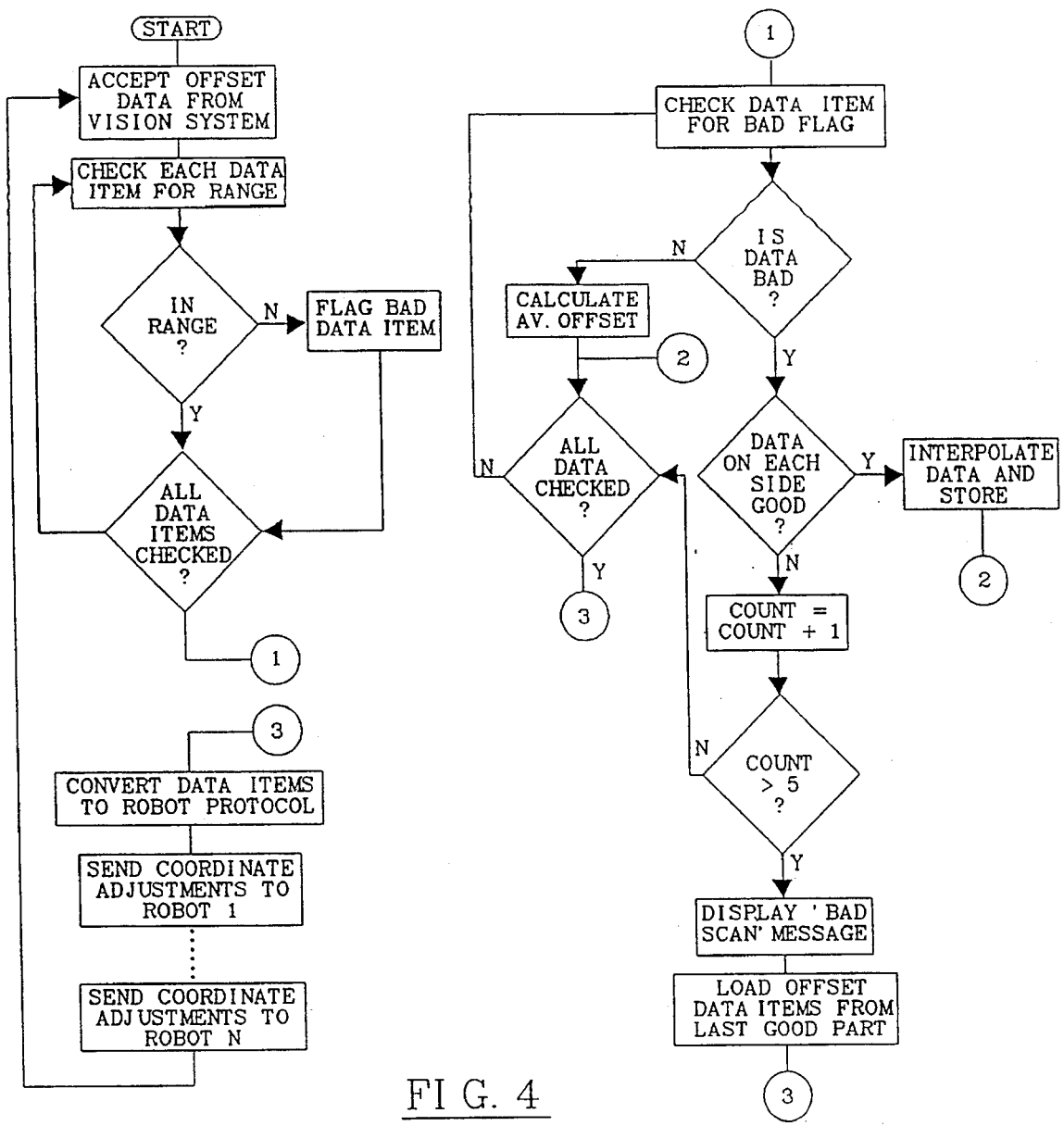
FIG. 4 is a flow chart of a program executed by the data processor shown in FIG. 1 for accepting data items from the vision system and interpolating bad data values to build a deviation data set that is translated into robot controller compatible format.

In order to ensure that welding proceeds as efficiently as possible, data processor 20 preferably runs a program to examine offset data received from the vision system to eliminate bad data items that may result when the part 18 is dirty, badly scratched, or otherwise marred so that the light intensity gradient at the weld seam is blurred or otherwise undetectable. FIG. 4 shows a flow chart of the program designed to minimize errors resulting from bad data. The data processor 20 is normally in an alert state waiting to accept offset data from the vision system 12. When data is communicated from the vision system 12, each data item is checked for range. If a data item is within a specified range, the next item is checked until all items have been checked. If the data item is not in range, a flag indicating a bad data item is set for that data item. After a first pass, the entire string of data items is examined a second time. The second pass checks each data item for a bad data item flag. If the data item is good (within range) it is used for calculating an average offset using a least squares method and stored into a conversion table for further processing. If the data item is flagged as bad, a data item immediately preceding and a data item immediately following the flagged data item are checked to determine if they are respectively good. If the preceding and following data items are both found to be good data items, an interpolation is made to assign the bad data item an offset which is equal to the average offset of the preceding and following offsets and the interpolated offset is stored in the conversion table. If one of the preceding or following data items is also bad, a count is incremented and the count is tested to ascertain whether its value has exceeded five. If more than five bad data items are encountered in succession, the program displays a "bad scan" message to alert the operator that the weld path on the part cannot be accurately located.

In the event of a bad scan, the offset data from the last part successfully scanned is loaded into the conversion table and the translation of the data items begins. If five or fewer successive bad data items are encountered, the bad items are interpolated using an average of the first preceding good data item and the first succeeding good data item. This average is verified against the average offset calculated using the least squares method and adjusted if it exceeds the calculated average offset by more than a predefined maximum. When all data items have been stored in the conversion table, each data item is translated into a three coordinate adjustment generally expressed as 0-0-Z where Z is the vertical coordinate adjustment required to position the robot on the weld seam at a respective point on the weld path. The coordinates are translated by the data processor 20 into a format readable by the robot controller 22 (see FIG. 1) and communicated to the robot controller 22. The robot controller 22 accepts the coordinate adjustments and converts them into adjustments to appropriate ones of the six axis coordinates used to control the position of the robot 24. The respective robots 24 are enabled to commence the welding operation after all adjustments to the coordinates are complete. Welding then proceeds in uninterrupted real time without further weld path adjustment.

The apparatus and the method in accordance with the invention provide quality welds that are reliably produced in a production environment. Furthermore, a cost effective vision control system that is able to service a plurality of robots is provided.

It is apparent from the foregoing that a new and useful approach to the automation of welding by robots has been invented. The preferred embodiment described is intended to be exemplary only and not as limiting to the scope or spirit of the invention.

We claim:

1. Apparatus for controlling the operation of a robot welder to effect the sequential welding of a plurality of parts having seams to be welded, each of the parts being similar to a known reference part, comprising:

means for supporting a one of the parts to be welded in a predetermined welding position so that the seam to be welded is supported in a predetermined plane;

an unoriented light source that is independent of the robot and positioned to illuminate the seam to be welded so that a light intensity gradient is detectable along the seam;

vision sensor means for acquiring a digital image of the seam to be welded, the vision sensor means being independent of the robot and positioned to acquire images that capture the light intensity gradient along the seam;

image processor means for accepting the images from the vision sensor means and for processing the images to determine from a digitized representation of the light intensity gradient a deviation of the seam with respect to a reference weld path on the reference part at each of a plurality of reference points spaced along the reference weld path;

data processor means for accepting each deviation from the image processor means and for converting each deviation to a coordinate adjustment for a respective one of each of the plurality of reference points, each coordinate adjustment being expressed in a format readable by a controller of the robot; and means for communicating the coordinate adjustments to the controller of the robot, whereby the robot is enabled to weld along the seam using predetermined adjusted coordinates for the seam to be welded in uninterrupted real time without further weld path scanning, computation or adjustment.

2. An apparatus for controlling the operation of a robot welder as claimed in claim 1 wherein the unoriented light source comprises a fluorescent light source which is positioned to illuminate the seam to be welded so that a light intensity gradient is detectable along the seam.

3. An apparatus for controlling the operation of a robot welder as claimed in claim 2 wherein the fluorescent light source is provided with a displaceable cover to protect the light source from welding debris during welding operations, the displaceable cover being movable from a position which permits the light source to illuminate the part to be welded to a position that protects the light source from welding debris.

4. An apparatus for controlling the operation of a robot welder as claimed in claim 3 wherein the displaceable cover is provided with a linkage and a means for driving the linkage so that the cover is automatically displaced from a closed and an opened position, as required by the welding process.

5. An apparatus for controlling the operation of a robot welder as claimed in claim 4 wherein the displacement of the cover is controlled by a one of the image processor means and the data processor means.

6. An apparatus for controlling the operation of a robot welder as claimed in claim 1 wherein the vision sensor means for acquiring a digital image of the seam to be welded is a solid state camera having a fixed focal length.

7. An apparatus for controlling the operation of a robot welder as claimed in claim 6 wherein the focal length of the solid state camera is selected to permit the camera to be located outside of the work envelope of the robot welder.

8. An apparatus for controlling the operation of a robot welder as claimed in claim 1 wherein the data processor means comprises a microcomputer.

9. A method for controlling the operation of a robot welder to effect the automatic welding of a seam on a part to be welded that is similar to a reference part having a weld path that has been taught to the robot, comprising:

a) illuminating the part to be welded with an unoriented light source that is independent of the robot to create a light intensity gradient that is detectable along the seam to be welded;

b) operating an electronic vision system sensor that is independent of the robot to acquire at least one digital image of the seam to be welded;

c) operating a vision system controller to analyze the at least one digital image to isolate an image of the seam to be welded; to compare the image of the seam to be welded with a stored image of the weld path on the reference part; and, to compute deviations in at least one plane of the image of the seam on the part to be welded from the weld path on the reference part;

d) operating the vision system controller to communicate the deviations to a data processor;

e) operating the data processor to translate the deviations to respective coordinate adjustments expressed in a format readable by a controller of the robot welder and to communicate the respective coordinate adjustments to the controller of the robot welder;

f) operating the controller of the robot welder to adjust the learned coordinates of the weld path of the reference part using the coordinate adjustments to provide an adjusted set of coordinate points that correspond to a weld path for the seam to be welded; and g) operating the robot to effect the welding of the seam using the set of adjusted coordinate points so that the seam can be accurately welded without visual detection or weld path corrections during the welding process.

10. A method for controlling the operation of a robot welder as claimed in claim 9 wherein the illuminating of the part to be welded is accomplished with a fluorescent light source that is positioned to create a light intensity gradient that is detectable along the seam to be welded.

11. A method for controlling the operation of a robot welder as claimed in claim 9 wherein the vision system sensor comprises a solid state camera with a fixed focal length that is positioned outside the work envelope of the robot.

12. A method for controlling the operation of a robot welder as claimed in claim 9 wherein the data processor runs a program to examine each deviation to ensure that respective deviations are within a predetermined range and that deviations which do not fall within the predetermined range are not communicated to the controller of the robot welders.

13. A method for controlling the operation of a robot welder as claimed in claim 12 wherein deviations which do not fall within the predetermined range are assigned a value equal to an average of a preceding and a subsequent deviations within range, provided that not more than five sequential deviations are outside of the predetermined range.

14. A method for controlling the operation of a robot welder as claimed in claim 13 wherein the deviations for a last part successfully scanned are substituted for the deviations of a scanned part if more than five sequential deviations are out of range.

15. A method for controlling the operation of a robot welder as claimed in claim 9 wherein the coordinate adjustments communicated to the controller of the robot welder are expressed in an x-y-z coordinate grid format.

16. A method for controlling the operation of a robot welder as claimed in claim 15 wherein the x-y-z coordinates are translated by the robot controller into adjustments to six axis coordinates used by the robot controller to position the robot for the automatic welding of the seam.

17. An apparatus for controlling the operation of a robot welder to effect the sequential welding of a plurality of parts having seams to be welded, each of the parts being similar to a known reference part, comprising:

means for supporting a one of the parts to be welded in a predetermined welding position so that the seam to be welded is supported in a predetermined plane;

a fluorescent light source that is independent of the robot and positioned to illuminate the seam to be welded so that a light intensity gradient is detectable along the seam;

at least one solid state camera for acquiring a digital image of the seam to be welded, the at least one solid state camera being independent of the robot and positioned to acquire images that capture the light intensity gradient along the seam;

an image processor for accepting images from the solid state camera and for processing the images to determine from a digitized representation of the light intensity gradient a deviation of the seam with respect to a reference weld path at each of a plurality of reference points spaced along the reference weld path;

a microcomputer for accepting each deviation from the image processor and for converting each deviation to a coordinate adjustment for a respective one of each of the plurality of reference points, each coordinate adjustment being expressed in a format readable by a controller of the robot; and a robot controller for accepting coordinate adjustments from the microcomputer and interpolating each coordinate adjustment into an adjustment of six axis coordinates learned by the robot at each of the plurality of reference points spaced along the reference weld path.

18. An apparatus for controlling the operation of a robot welder as claimed in claim 17 wherein the microcomputer operates a program to examine each deviation of the seam with respect to a reference weld path on the reference part to ascertain whether the deviation is within a predefined range of tolerance, and to substitute another value for any deviation which does not fall within the predetermined range of tolerance.

19. A method for controlling the operation of a robot welder to effect the automatic welding of a seam on a part to be welded that is similar to a reference part having a weld path that has been taught to the robot, comprising:

a) illuminating the part to be welded using a fluorescent light source that is independent of the robot to create a light intensity gradient that is detectable along the seam to be welded;

b) operating a solid state video camera that is independent of the robot to acquire at least one digital image of the seam to be welded;

c) operating a vision system controller to analyze the at least one digital image to isolate an image of the seam to be welded; to compare the image of the seam to be welded with a stored image of the weld path on the reference part; and, to compute deviations in at least one plane of the image of the seam on the part to be welded from the weld path on the reference part;

d) operating the vision system controller to communicate the deviations to a microcomputer;

e) operating the microcomputer to examine each deviation for range and to substitute values for deviations out of range;

f) operating the microcomputer to translate the deviations to respective coordinate adjustments expressed in a format readable by a controller of the robot welder and to communicate the respective coordinate adjustments to the controller of the robot welder;

g) operating the controller of the robot welder to adjust the learned coordinates of the weld path of the reference part using the coordinate adjustments to provide an adjusted set of coordinate points that correspond to the weld path for the seam to be welded; and h) operating the robot to effect the welding of the seam using the set of adjusted coordinate points so that the seam can be accurately welded without visual detection or weld path correction during the welding process.

20. The method as claimed in claim 19 wherein the microprocessor substitutes the deviations for a given part with the deviations for a previously scanned acceptable part if more than five consecutive deviations for the given part fall outside an acceptable range.

* * * * *